US012283090B2

(12) United States Patent
Chokkadi et al.

(10) Patent No.: US 12,283,090 B2
(45) Date of Patent: Apr. 22, 2025

(54) AUTOMATICALLY DETERMINING MODIFIED IMAGE DATA USING ARTIFICIAL INTELLIGENCE TECHNIQUES

(71) Applicant: Dell Products L.P., Round Rock, TX (US)

(72) Inventors: Sukhada Chokkadi, Mangalore (IN); Alan Dillane, Senec (SK); Sai Namrata Gaur, Madhya Pradesh (IN); Ashima Gupta, Bangalore (IN); Lokeshwar Jha, New Delhi (IN); Kristin Jean Kevern, Leander, TX (US); Dinesh Koppada, Bengaluru (IN); Petra Kropacek, Bratislava (SK); Kannapiran Ramaswamy, Cedar Park, TX (US); Sanchi Srivastava, Georgetown, TX (US); Sivakami Swamynathan, Bangalore (IN); Mrunal T V, Karnataka (IN); Cheryl Young, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 411 days.

(21) Appl. No.: 17/842,363

(22) Filed: Jun. 16, 2022

(65) Prior Publication Data
US 2023/0410476 A1 Dec. 21, 2023

(51) Int. Cl.
*G06V 10/764* (2022.01)
*G06T 7/00* (2017.01)
*G06V 10/77* (2022.01)

(52) U.S. Cl.
CPC ......... *G06V 10/765* (2022.01); *G06T 7/0002* (2013.01); *G06V 10/7715* (2022.01); *G06T 2207/30168* (2013.01)

(58) Field of Classification Search
None
See application file for complete search history.

(56) References Cited

U.S. PATENT DOCUMENTS 8,041,703 B2 * 10/2011 Rao ............... G06F 16/951
707/709
8,165,405 B2 * 4/2012 Lim ............... G06V 40/20
382/224

(Continued)

OTHER PUBLICATIONS

Wikipedia, Oversight Systems, https://en.wikipedia.org/w/index.php?title=Oversight_Systems&oldid=1088927022, May 20, 2022.

(Continued)

*Primary Examiner* — Tahmina N Ansari
(74) *Attorney, Agent, or Firm* — Ryan, Mason & Lewis, LLP

(57) ABSTRACT

Methods, apparatus, and processor-readable storage media for automated image analysis using artificial intelligence techniques are provided herein. An example computer-implemented method includes obtaining image data associated with at least one event; characterizing a plurality of attributes of the image data by processing at least a portion of the image data using one or more artificial intelligence techniques and processing metadata associated with at least a portion of the image data using one or more rule-based techniques; generating a determination as to whether one or more portions of the image data have been modified based at least in part on the plurality of characterized attributes of the image data; and performing one or more automated actions, based at least in part on the determination, in connection with at least one user request related to the image data associated with the at least one event.

20 Claims, 6 Drawing Sheets

(56) References Cited

U.S. PATENT DOCUMENTS

| | | | | |
|---|---|---|---|---|
| 11,074,495 | B2* | 7/2021 | Zadeh | G06F 18/2413 |
| 11,195,057 | B2* | 12/2021 | Zadeh | G06N 3/006 |
| 11,568,423 | B2* | 1/2023 | Miller | G06Q 50/18 |
| 11,763,236 | B1* | 9/2023 | Sharma | G06F 40/40 |
| | | | | 707/737 |
| 2008/0033998 | A1* | 2/2008 | Rao | G06F 16/951 |
| 2018/0114082 | A1* | 4/2018 | Choi | G06V 10/993 |
| 2019/0122258 | A1* | 4/2019 | Bramberger | G06N 3/08 |
| 2022/0253871 | A1* | 8/2022 | Miller | G06F 16/36 |
| 2023/0410476 | A1* | 12/2023 | Chokkadi | G06T 7/0002 |

OTHER PUBLICATIONS

AppZen, https://www.appzen.com/modern-finance-products, accessed May 23, 2022.

\* cited by examiner

*FIG. 4*

```
Function to extract 64 DCT and quality-related features (image names) {
    Convert images into corresponding error level analysis image array
    Calculate 64 DCT coefficients of images
    Calculate quality-related features (e.g., average distortion, number of peaks, blurriness, size of image)
    Assign labels 0 and 1 for un-modified and modified images, respectively
    Return 64 DCT coefficients and quality-related features of training data
end
~

Function to perform RandomSearchCV to choose best model and parameters (image features, labels) {
    Perform RandomSearchCV on a combination of different models and choose best model and corresponding hyperparameters in terms of F1 and accuracy
    Return the best model and parameters
end
~

Function to train the model (training data, label(s)) {
    Train the chosen model, with corresponding parameters, using training data and test model performance with test data
    Return the predictions of the model test
end
~
```

400

AUTOMATICALLY DETERMINING MODIFIED IMAGE DATA USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for processing image data in such systems.

BACKGROUND

Enterprises commonly participate in a variety of marketing activities including virtual and in-person marketing vehicles such as, for example, events, digital media content, traditional media content, etc. Additionally, many enterprises regularly utilize third parties such as vendors, marketing agencies, channel partners, etc. to perform certain marketing activities. In such scenarios, an enterprise may receive reimbursement requests for costs associated with the marketing activities, as evidenced by documentation which can often include photographs and/or digital images provided by the third party which performed the relevant activities. Such image-based documentation in this context, though, can be vulnerable to fraud and/or other disingenuous activity, whereby modified image data can be provided in an attempt to obtains funds from the enterprise. However, conventional image-based documentation analysis in such contexts typically involves manual review of individual images, which is error-prone and resource-intensive.

SUMMARY

Illustrative embodiments of the disclosure provide techniques for automated image analysis using artificial intelligence techniques. An exemplary computer-implemented method includes obtaining image data associated with at least one event, and characterizing a plurality of attributes of the image data by processing at least a portion of the image data using one or more artificial intelligence techniques and processing metadata associated with at least a portion of the image data using one or more rule-based techniques. Additionally, the method includes generating a determination as to whether one or more portions of the image data have been modified based at least in part on the plurality of characterized attributes of the image data, and performing one or more automated actions, based at least in part on the determination, in connection with at least one user request related to the image data associated with the at least one event.

Illustrative embodiments can provide significant advantages relative to conventional image-based documentation analysis. For example, problems associated with error-prone and resource-intensive image reviewing tasks are overcome in one or more embodiments through automatically processing image data using artificial intelligence techniques. These and other illustrative embodiments described herein include, without limitation, methods, apparatus, systems, and computer program products comprising processor-readable storage media.

BRIEF DESCRIPTION OF THE DRAWINGS

FIG. 4 shows example pseudocode for implementing a machine learning-based binary classifier in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
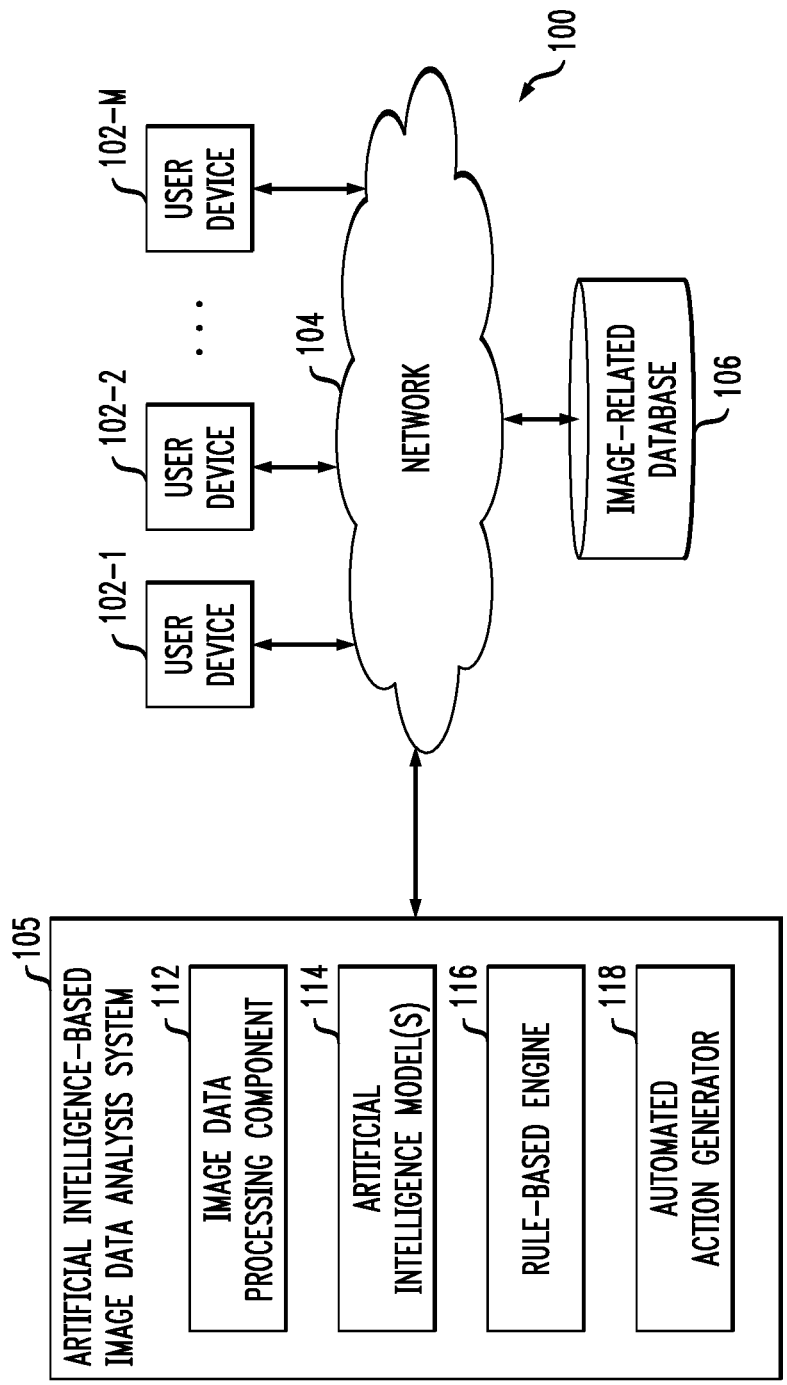
FIG. 1 shows an information processing system configured for automated image analysis using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is artificial intelligence-based image data analysis system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, artificial intelligence-based image data analysis system 105 can have an associated image-related database 106 configured to store data and metadata pertaining to provided and/or uploaded images, which comprise, for example, information related to image size, image quality, blurriness, temporal parameters, editing software, geolocation parameters, etc.

The image-related database 106 in the present embodiment is implemented using one or more storage systems associated with artificial intelligence-based image data analysis system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with artificial intelligence-based image data analysis system 105 are one or more input-output devices, which illustratively comprise keyboards, displays or other types of input-output devices in any combination. Such input-output devices can be used, for example, to support one or more user interfaces to artificial intelligence-based image data analysis system 105, as well as to support communication between artificial intelligence-based image data analysis system 105 and other related systems and devices not explicitly shown.

Additionally, artificial intelligence-based image data analysis system 105 in the FIG. 1 embodiment is assumed to be implemented using at least one processing device. Each such processing device generally comprises at least one processor and an associated memory, and implements one or more functional modules for controlling certain features of artificial intelligence-based image data analysis system 105.

More particularly, artificial intelligence-based image data analysis system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows artificial intelligence-based image data analysis system 105 to communicate over the network 104 with the user devices 102, and illustratively comprises one or more conventional transceivers.

The artificial intelligence-based image data analysis system 105 further comprises image data processing component 112, artificial intelligence model(s) 114, rule-based engine 116, and automated action generator 118.

It is to be appreciated that this particular arrangement of elements 112, 114, 116 and 118 illustrated in the artificial intelligence-based image data analysis system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automated image analysis using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, artificial intelligence-based image data analysis system 105 and image-related database 106 can be on and/or part of the same processing platform.

An exemplary process utilizing elements 112, 114, 116 and 118 of an example artificial intelligence-based image data analysis system 105 in computer network 100 will be described in more detail with reference to the flow diagram of FIG. 5.

Accordingly, at least one embodiment includes generating and/or implementing at least one image data analysis system (e.g., system 105 in the example embodiment depicted in FIG. 1), which incorporates machine learning and artificial intelligence capabilities to automatically detect images (e.g., photographs) that may have been modified and/or edited. By way merely of example, an activity provider (e.g., a third party seeking reimbursement from an enterprise) can provide and/or upload one or more digital images to the image data analysis system (and/or a related system which interfaces with the image data analysis system). As further detailed herein, in one or more embodiments, the image data analysis system can then process at least a portion of the metadata and pixel-related information of the one or more digital image to determine the probability of the image(s) being altered. Based at least in part on this determination, the image data analysis system can generate and/or output at least one report to one or more users associated with the enterprise (e.g., identifying a number of potentially fraudulent images on the basis of level of alteration), and/or can initiate one or more automated actions pertaining to the provided image data (e.g., granting or denying a request associated with the image data submission).

As further detailed herein, the image data analysis system, in one or more embodiments, can include artificial intelligence techniques (e.g., one or more machine learning models) that learns from stored historical image data, extracts metadata from provided and/or input images, and compares the extracted metadata to at least a portion of the stored image data to identify the provided and/or input images as passing (e.g., not modified) or failing (e.g., modified). Further, in at least one embodiment, the image data analysis system can use deep learning techniques to analyze portions of such provided and/or input images (e.g., bright or discontinuous spots in the image) to additionally facilitate a determination that the provided and/or input images have been modified prior to submission.

One or more embodiments include detecting altered and/or modified images (e.g., potentially fraudulent image data submissions) across a variety of bases. For example, image data can be modified using copy-move techniques, wherein a part of an image is covered in order to add and/or remove information. Additionally, image data can be modified using splicing techniques, which can include making a composite image using portions from separate images. By way of further example, image data can be modified using removal techniques, which can include removing and/or erasing portions of an original image (e.g., by exemplar-based image inpainting in a visually-plausible manner).

In addition to different types of image data modification techniques, one or more embodiments can also include managing and/or processing different types of files. For example, at least one embodiment can include processing image file types such as JPEG, JPG, etc., PowerPoint Open XML (PPTx) files (including, e.g., images inside such files), portable document format (PDF) files (including, e.g., images inside such files), and ZIP files (including, e.g., a collection of PPTs, PDFs, images, etc.).

As further detailed herein at least one embodiment includes implementing a phase-wise analysis in connection with detecting modified image data. For example, such an embodiment can include phases that include metadata analysis, rule-based analysis, image quality detection, advanced image analysis, binary classification, and deep learning. With respect to metadata analysis, provided and/or uploaded image data commonly include metadata that describe information such as the source of the image, the date and/or time that the image was captured and/or modified, the location at which the image was captured, etc. With respect to rule-based analysis, one or more embodiments can include extracting and/or processing different information from the image data based at least in part on user and/or enterprise input(s).

Additionally, with respect to image quality detection, image quality commonly deteriorates when the image is saved multiple times, and as such, detecting image quality can facilitate a determination as to whether the image was edited and saved multiple times. Also, in at least one embodiment, advanced image analysis can include implementing methods such as, for example, error level analysis, wavelet transformations, discrete cosine transform (DCT), etc., as means for identifying and/or describing one or more specific image manipulations. Further, in one or more embodiments, binary classification can be used to train one or more artificial intelligence models implemented to distinguish images as modified (e.g., fraudulent) or not modified (e.g., non-fraudulent). As also noted above and detailed herein, deep learning techniques can be implemented to learn one or more features that can distinguish different image editing operations based on the classification of one or more image patches in a pair-wise fashion. In such an embodiment, an error level analysis of every image can be extracted, which helps in identifying image portions with different levels of compression. Thus, in a modified (e.g., fraudulent) image, modified areas can be identified due to their characteristic aspects in the error level analysis representation. Further, the DCT coefficients of such error level analysis images can be extracted and trained using one or more algorithms to obtain the best model in terms of accuracy. After learning different features to categorize an image as modified (e.g., fraudulent), such an embodiment can include detecting edited images that are not present in a given training dataset.

In one or more embodiments, various rules can be implemented, pertaining to image metadata, image statistical properties, etc., as part of the automated image data analysis. For example, rules pertaining to image metadata can include at least one rule related to temporal information such as, e.g., checking the data of creation for the image and any date of modification for the image, and raising an alert if the dates do not match. Another rule pertaining to image metadata can include at least one rule related to software information such as, e.g., checking whether software and/or one or more applications used to modify images is present and/or identified. Yet another rule pertaining to image metadata can include at least one rule related to geolocation information such as, e.g., extracting and/or checking any geolocation tags from the image data and verifying whether the image was taken and/or captured at the given location (e.g., at a particular event location associated with the image submission).

Rules pertaining to image statistical properties can include at least one rule related to image quality such as, e.g., approximating if an image in question is a single image or a double compressed image, for example, by checking if the image has been resaved after initial capture. Another rule pertaining to image statistical properties can include at least one rule related to average distortion such as, e.g., checking for miscellaneous statistics with respect to distortion, quality of image, etc., and generating at least one score representative thereof. Further, another rule pertaining to image statistical properties can include at least one rule related to blurriness such as, e.g., generating at least one score based at least in part on the blurriness factor of the given image data. Also yet another rule pertaining to image statistical properties can include at least one rule related to a local binary pattern (LBP), wherein at least one machine learning model, which uses DCT of an LBP of an image as features in a binary classifier, is implemented in connection with processing input image data. In connection with one or more embodiments, a DCT expresses a finite sequence of data points in terms of a sum of cosine functions oscillating at different frequencies. Such DCT features can be calculated for modified (e.g., fraudulent) and un-modified (e.g., non-fraudulent) images, and the corresponding features can be assigned a label accordingly (e.g., "0" for non-fraudulent and "1" for fraudulent). Then, such features, along with one or more other quality-related features, are trained, using one or more algorithms, against the assigned label.

Accordingly, in one or more embodiments, metadata of as image can extracted using one or more Python programs, and information such as creation date, modification date, software, geolocation, etc. can be extracted from the image metadata. Further, as noted above and additionally detailed herein, pixel-level analysis is carried out as well (e.g., as some actors who modify or edit images may attempt to delete or alter portions of metadata), wherein such analysis can include determining whether an image was resaved multiple times, estimating overall distortion in the image, determining levels of blurriness and/or pixel discontinuity for one or more portions of the image, implementing LBP in connection with DCT.

As also detailed herein, at least one embodiment includes implementing at least one machine learning-based binary classifier, trained using modified (e.g., fraudulent) and un-modified (e.g., non-fraudulent) images. Such a model can utilize (e.g., be trained on) different image-related features such as, for example, image quality, average distortion, one or more metadata rules, DCT features, etc. To generate such a model, one or more embodiments include using external datasets and/or event-related images (e.g., relevant for the given user and/or enterprise). For example, in at least one embodiment, at least a portion of such event-related images (e.g., the images identified as modified and/or fraudulent) can be augmented for the purposes of training the at least one machine learning-based binary classifier.

One or more embodiments can include partitioning images from external datasets and event-related images into training and validation sets (e.g., after keeping 5-10% of the images from each dataset separate as a part of an extra validation sub-set, which can be used for testing the at least one machine learning-based binary classifier after initial testing have resulted in sufficient levels of performance). In accordance with such an embodiment, one or more validation sets can be used to improve and/or fine-tune a model, and the 5-10% of the images separated from each dataset noted above, can be used as a validation set to evaluate the model after the model building is completed. Also, in such an embodiment, the test data are curated and can include sampled data that span both classes. Thus, the training data are divided into training, cross-validation, and testing sub-sets.

Additionally, in at least one embodiment, one or more evaluation metrics can be used in connection with the at least one machine learning-based binary classifier. For example, such evaluation metrics can include an F1 score and the Matthews correlation coefficient (MCC). By way merely of illustration, if multiple classes (e.g., modified and un-modified, fraudulent and non-fraudulent, etc.) are of interest in a given embodiment, a binary classification problem can be treated as a multi-class problem with the multiple classes, including calculating one or more corresponding multi-class metrics such as micro-averaged and/or macro-averaged precision, recall, F1 score, etc. The MCC, as used in one or more embodiments, considers a true class and a predicted class as two (binary) variables and computes their correlation coefficient. The higher the correlation between true and predicted values, the better (e.g., more accurate) the prediction. Commonly, the value of the MCC lies between −1 and 1, and the MCC takes into account all four values in a confusion matrix, and a high value (in this instance, close to 1) indicates that both classes are predicted well, even if one class is disproportionately under-represented or over-represented.

In one or more embodiments, computing an MCC score can be carried out, for example, using the following equation:

$$MCC = \frac{(TP*TN)-(FP*FN)}{\sqrt{(TP+FP)(TP+FN)(TN+FP)(TN+FN)}},$$

wherein true positive (TP) represents one or more instances wherein the model correctly predicted the positive class, true negative (TN) represents one or more instances wherein the model correctly predicted the negative class, false positive (FP) represents one or more instances wherein the model incorrectly predicted the positive class; and false negative (FN) represents one or more instances wherein the model incorrectly predicted the negative class.

Also, in one or more embodiments, computing an F1 score can be carried out, for example, using the following equation:

$$F1 = \frac{TP}{TP + \frac{1}{2}(FP+FN)}.$$

Additionally or alternatively, at least one embodiment can include implementing one or more similarity measures. For example, such measures can be implemented in scenarios wherein no image modification techniques have been used on images, but the potential for fraudulent activity remains. By way merely of illustration, such an instance might include the utilization of an un-modified image from a past event in lieu of an image from a given event in question (e.g., the image data submitted may be from a valid event and may not contain any fraudulent modifications, but the submission is in connection with a reimbursement request for a separate event that the requestor did not attend). Another example might include submission of image data from only one location to request reimbursement for multiple events occurring at different locations. For instance, consider a scenario wherein an event was scheduled to be held across four different cities, but a given vendor only supported the event in one of the four cities while taking images from different angles to submit as fraudulent evidence for participating in the event at all four cities.

Such types of fraud would involve un-modified images, with potentially limited changes (e.g., no changes) to image pixels or metadata. Accordingly, one or more embodiments includes implementing at least one similarity measures to identify other images (in a stored database of previous images and/or as part of the set of provided and/or uploaded images in connection with a given event) that share a given level of similarity (e.g., as quantified on a percentage basis) with a given image in question. By way merely of example, consider a first image which exactly matches an input image (i.e., 100% similarity) and a second image (e.g., having 87.37% similarity to the input image) which includes the same landscape (as the input image) but onto which a logo is pasted and/or added. In one or more embodiments, such a methodology is implemented using a nearest neighbor algorithm. For example, to determine the top five similar images from a set of images, a cosine similarity score is calculated between each image and the neighboring image, and this is considered as the image signature. In such an embodiment, a cosine similarity score is a metric used to measure how similar the images are irrespective of their size. At least one embodiment can then include executing a clustering algorithm to group at least a portion of these images based on the similarity scores. Additionally, in one or more embodiments, any incoming image will go through the same process as noted above, and once the image signature is extracted, the image signature is compared with the top five nearest signatures, and the top five signatures are then returned with their respective file path information, which is accessed to read the same and display in one or more reports.

At least one embodiment also includes implementing one or more localization techniques. Such techniques can include, for example error level analysis and reverse error level analysis, which can be carried out on images to map at least one unusual change in overall brightness of the image. By way merely of example, consider a first image which has a red circle around an enterprise logo, identifying the area which is edited and/or superimposed on the background image. The same can be confirmed from analysis of a second image, which shows an unusual brightness in the position of the image where the enterprise logo is placed. Analysis such as this facilitate understanding of particular modification and/or fraud location(s) within an image.

In one or more embodiments, scoring is performed and/or carried out, for example, to give priority to certain rules and types of analyses with respect to others. Accordingly, based on the importance of such rules and/or types of analyses, at least one embodiment can include generating a final score for a given image which provides an indication as to whether the given image has been modified (e.g., is fraudulent).

Figure 2:
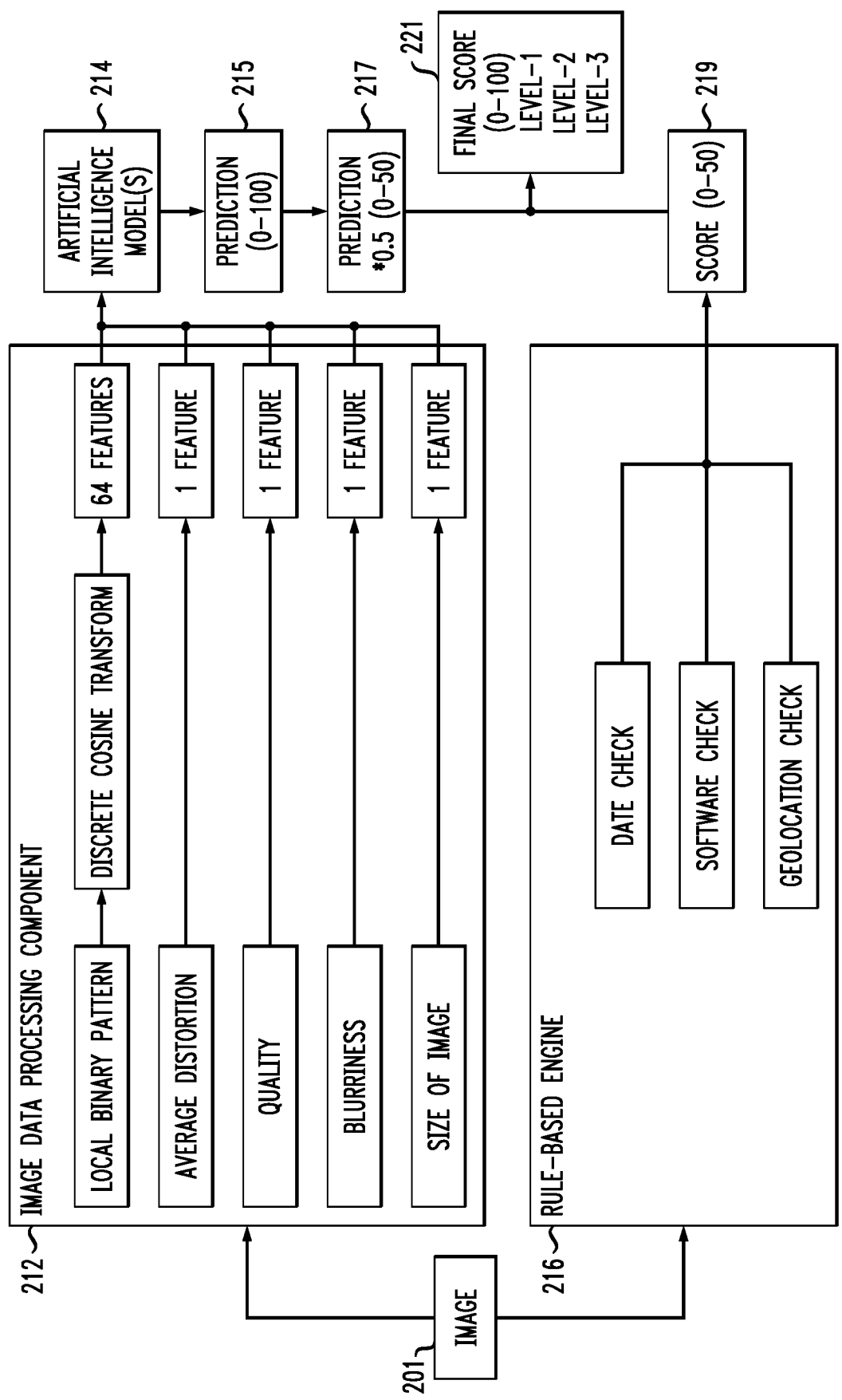
FIG. 2 shows an example scoring workflow in an illustrative embodiment.

FIG. 2 shows an example scoring workflow in an illustrative embodiment. By way of illustration, FIG. 2 depicts an example embodiment wherein a final score 221, ranging from 0-100, is assigned to a given image 201, of which fifty percent corresponds to metadata score 219 generated by rule-based engine 216 (e.g., date checks, software checks, geolocation checks, etc.) and fifty percent corresponds to prediction (probability score) 215 (e.g., scaled to 0-50) generated by artificial intelligence model(s) 214 and scaled in step 217.

As also depicted in FIG. 2, artificial intelligence model(s) 214 is trained using features (e.g., pixel-level features) obtained and/or generated via image data processing component 212 including image quality, blurriness, average distortion, DCT features of LBP and image size. More specifically, and as depicted in FIG. 2, the 64 DCT features and other features of the image 201 are fed as input to the artificial intelligence model(s) 214, and the artificial intelligence model(s) 214 is trained using at least a portion of these features.

Artificial intelligence model(s) 214 generates a prediction probability score 215 (e.g., a prediction) between 0-100, which is then multiplied by 0.5 in step 217 to change the scale. This output is then combined with an output (e.g., metadata score 219) from the metadata level analysis carried out by rule-based engine 216, to generate the final score 221. In an example embodiment such as depicted in FIG. 2, the final score 221 is generated after summing the quality-related score generated in step 217 and the metadata score 219. In one or more embodiments, the final score 221 is classified into one of three categories or levels (based on the score value). For example, such categories or levels can include the following: Level 1 being associated with a score between 0-50; Level 2 being associated with a score between 51-70; and Level 3 being associated with a score between 71-100. In such an embodiment, the system and/or a user (e.g., a reviewer) could, for example, prioritize images with Level 3 and/or Level 2 scores.

In one or more embodiments, a report is automatically generated after the analysis is completed on a set of provided and/or uploaded images. Such a report can include, for example, the final score(s) for at least a portion of the images, along with information pertaining to metadata checks and pixel level checks, as well as a given number of similar images (for one or more of the images in question), and one or more localized images.

Figure 3:
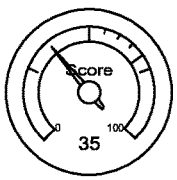
FIG. 3 shows a portion of an example report in an illustrative embodiment.

FIG. 3 shows a portion of an example report in an illustrative embodiment. By way of illustration, FIG. 3 depicts analysis results for a given image (e.g., Image1). More specifically, FIG. 3 depicts an example interface 300 which displays the results of various image quality checks with respect to Image1 (e.g., date check, software check, geolocation check, quality check, average distortion check, blur check, LBP, etc.), wherein such results include message text (e.g., text briefly describing an aspect of the given quality check) and a status indication (e.g., an indication of whether Image1 passed or failed the given quality check, or if a distinct determination could not be made). Example interface 300 also displays metadata analysis results for Image1 (e.g., including given field identifiers and corresponding values) as well as a final result indication, which can include a graphical identification of whether Image1 passed or failed the given metadata analysis, or if a distinct determination could not be made.

Additionally, at least one embodiment includes automatically retraining and/or fine-tuning at least a portion of the artificial intelligence techniques detailed herein based at least in part on user feedback. For example, in one or more embodiments, the generated report can contain at least one link that opens a feedback portal and/or interface, wherein the user can provide feedback on the system's performance. Feedback data can be processed, for example, on an image-by-image basis, wherein such processing includes labeling data (e.g., labeling correctly identified modified images as such, etc.) before retraining the artificial intelligence techniques using at least a portion of the labeled data.

FIG. 4 shows example pseudocode for implementing a machine learning-based binary classifier in an illustrative embodiment. In this embodiment, example pseudocode 400 is executed by or under the control of at least one processing system and/or device. For example, the example pseudocode 400 may be viewed as comprising a portion of a software implementation of at least part of artificial intelligence-based image data analysis system 105 of the FIG. 1 embodiment.

The example pseudocode 400 illustrates a function for extraction of features from every image in a set of images, wherein the features include the 64 DCT coefficients and one or more quality-related features of the error level analysis of each image. The function also assigns, based at least in part on the feature extraction, labels 0 and 1 for non-fraudulent and fraudulent images, respectively. Example pseudocode 400 also illustrates performing a random search cross-validation (CV) to determine the best model for the extracted features, along with determining parameters of the model. As also depicted in FIG. 4, example pseudocode 400 illustrates training the determined best model using the images, and testing results of model execution against a test dataset.

It is to be appreciated that this particular example pseudocode shows just one example implementation of a machine learning-based binary classifier, and alternative implementations of the process can be used in other embodiments.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 5:
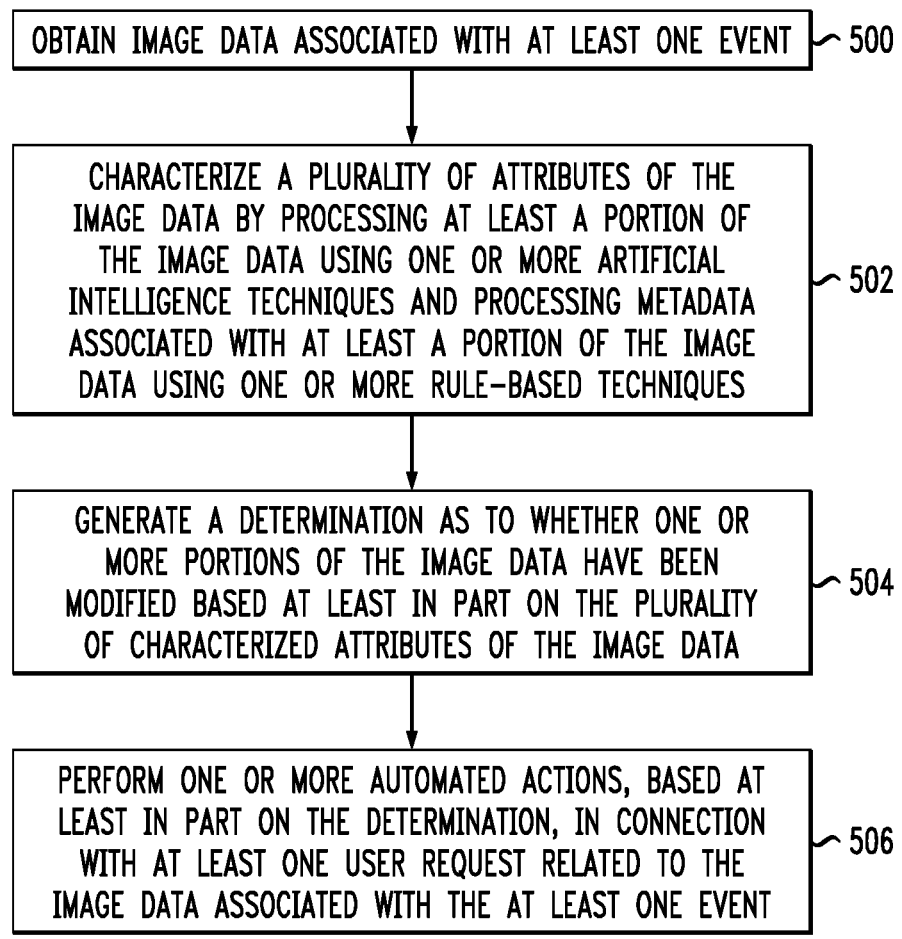
FIG. 5 is a flow diagram of a process for automated image analysis using artificial intelligence techniques in an illustrative embodiment.

FIG. 5 is a flow diagram of a process for automated image analysis using artificial intelligence techniques in an illustrative embodiment. It is to be understood that this particular process is only an example, and additional or alternative processes can be carried out in other embodiments.

In this embodiment, the process includes steps 500 through 506. These steps are assumed to be performed by artificial intelligence-based image data analysis system 105 utilizing its elements 112, 114, 116 and 118. Step 500 includes obtaining image data associated with at least one event. As used herein, the term "event" is intended to be broadly construed, so as to encompass, for example, any occasion, occurrence, incident or other activity for which image data are generated.

Step 502 includes characterizing a plurality of attributes of the image data by processing at least a portion of the image data using one or more artificial intelligence techniques and processing metadata associated with at least a portion of the image data using one or more rule-based techniques. In at least one embodiment, processing at least a portion of the image data using one or more artificial intelligence techniques includes processing at least a portion of the image data using at least one machine learning-based binary classifier. Additionally or alternatively, processing at least a portion of the image data using one or more artificial intelligence techniques can include processing, using one or more artificial intelligence techniques, image data pertaining to one or more of distortion information, image quality, blurriness information, and image size information. Further, in one or more embodiments, processing at least a portion of the image data using one or more artificial intelligence techniques includes processing at least a portion of the image data using at least one discrete cosine transform in connection with one or more local binary patterns. Also, processing at least a portion of the image data using one or more artificial intelligence techniques can include processing, using deep learning techniques, portions of the image data associated with one or more given optical features (e.g., bright spots and/or discontinuous spots in the image).

In one or more embodiments, processing metadata associated with at least a portion of the image data using one or more rule-based techniques includes processing, using one or more rule-based techniques, metadata pertaining to one or more of location information associated with capture of the image data, temporal information associated with capture of the image data, and photo editing software associated with the image data.

Step 504 includes generating a determination as to whether one or more portions of the image data have been modified based at least in part on the plurality of characterized attributes of the image data. In at least one embodiment, generating a determination as to whether one or more portions of the image data have been modified includes computing a score indicative of an amount of image modification by combining weighted values associated with the plurality of characterized attributes of the image data.

Step 506 includes performing one or more automated actions, based at least in part on the determination, in connection with at least one user request related to the image data associated with the at least one event (e.g., a reimbursement request related to event-related activities). In one or more embodiments, performing one or more automated actions includes automatically training the one or more artificial intelligence techniques based at least in part on the determination and user feedback to the determination. Additionally or alternatively, performing one or more automated actions can include automatically initiating one or more actions, in connection with one or more external systems, related to one of granting the at least one user request and denying the at least one user request. Further, in at least one embodiment, performing one or more automated actions includes automatically generating and outputting at least one report detailing one or more items of information related to the determination. In such an embodiment, the one or more items of information related to the determination can include level of modification attributed to one or more portions of the image data associated with the at least one event, and/or one or more separate images associated with one or more determined levels of similarity with one or more portions of the image data associated with the at least one event.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically process image data using artificial intelligence techniques. These and other embodiments can effectively overcome problems associated with error-prone and resource-intensive image reviewing tasks.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
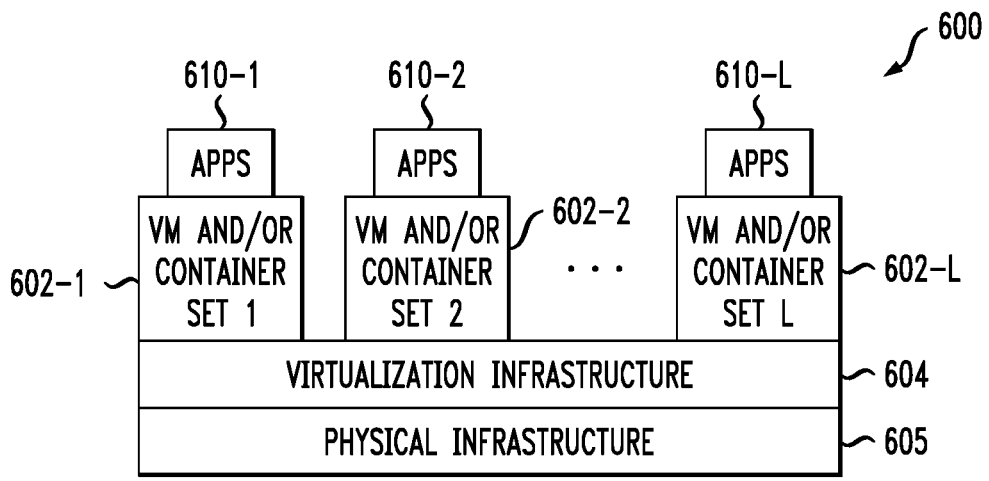
FIGS. 6 and 7 show examples of processing platforms that may be utilized to implement at least a portion of an information processing system in illustrative embodiments.
Figure 7:
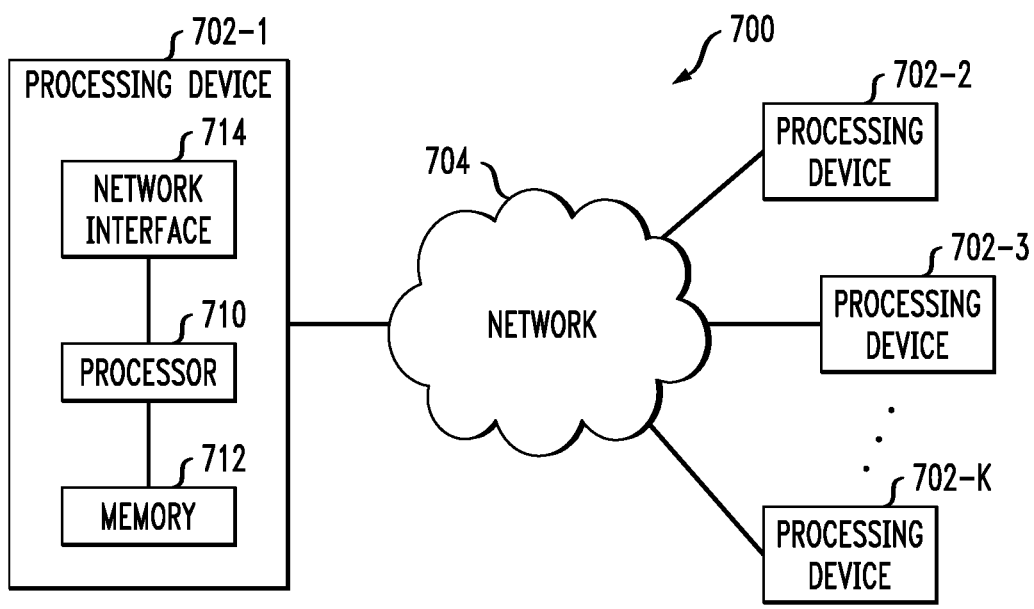

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more information processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a CPU, a GPU, a TPU, a microcontroller, an ASIC, a FPGA or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining image data associated with at least one event;
    characterizing a plurality of attributes of the image data
        by processing at least a portion of the image data using one or more artificial intelligence techniques and processing metadata associated with at least a portion of the image data using one or more rule-based techniques, wherein processing metadata associated with the at least a portion of the image data comprises processing, using the one or more rule-based techniques, metadata pertaining to location information associated with capture of the image data, temporal information associated with capture of the image data, and one or more indications of photo editing software associated with the image data;
    generating a determination as to whether one or more portions of the image data have been modified based at least in part on the plurality of characterized attributes of the image data; and
    performing one or more automated actions, based at least in part on the determination, in connection with at least one user request related to the image data associated with the at least one event;
    wherein the method is performed by at least one processing device comprising a processor coupled to a memory.

2. The computer-implemented method of claim 1, wherein processing at least a portion of the image data using one or more artificial intelligence techniques comprises processing at least a portion of the image data using at least one machine learning-based binary classifier.

3. The computer-implemented method of claim 1, wherein processing at least a portion of the image data using one or more artificial intelligence techniques comprises processing, using one or more artificial intelligence techniques, image data pertaining to one or more of distortion information, image quality, blurriness information, and image size information.

4. The computer-implemented method of claim 1, wherein processing at least a portion of the image data using one or more artificial intelligence techniques comprises processing at least a portion of the image data using at least one discrete cosine transform in connection with one or more local binary patterns.

5. The computer-implemented method of claim 1, wherein processing at least a portion of the image data using one or more artificial intelligence techniques comprises processing, using deep learning techniques, portions of the image data associated with one or more given optical features.

6. The computer-implemented method of claim 1, wherein generating a determination as to whether one or more portions of the image data have been modified comprises computing a score indicative of an amount of image modification by combining weighted values associated with the plurality of characterized attributes of the image data.

7. The computer-implemented method of claim 1, wherein performing one or more automated actions comprises automatically training the one or more artificial intelligence techniques based at least in part on the determination and user feedback to the determination.

8. The computer-implemented method of claim 1, wherein performing one or more automated actions comprises automatically initiating one or more actions, in connection with one or more external systems, related to one of granting the at least one user request and denying the at least one user request.

9. The computer-implemented method of claim 1, wherein performing one or more automated actions comprises automatically generating and outputting at least one report detailing one or more items of information related to the determination.

10. The computer-implemented method of claim 9, wherein one or more items of information related to the determination comprises one or more of level of modification attributed to one or more portions of the image data associated with the at least one event, and one or more separate images associated with one or more determined levels of similarity with one or more portions of the image data associated with the at least one event.

11. A non-transitory processor-readable storage medium having stored therein program code of one or more software programs, wherein the program code when executed by at least one processing device causes the at least one processing device:

to obtain image data associated with at least one event;
to characterize a plurality of attributes of the image data by processing at least a portion of the image data using one or more artificial intelligence techniques and processing metadata associated with at least a portion of the image data using one or more rule-based techniques, wherein processing metadata associated with the at least a portion of the image data comprises processing, using the one or more rule-based techniques, metadata pertaining to location information associated with capture of the image data, temporal information associated with capture of the image data, and one or more indications of photo editing software associated with the image data;
to generate a determination as to whether one or more portions of the image data have been modified based at least in part on the plurality of characterized attributes of the image data; and
to perform one or more automated actions, based at least in part on the determination, in connection with at least one user request related to the image data associated with the at least one event.

12. The non-transitory processor-readable storage medium of claim 11, wherein processing at least a portion of the image data using one or more artificial intelligence techniques comprises processing at least a portion of the image data using at least one machine learning-based binary classifier.

13. The non-transitory processor-readable storage medium of claim 11, wherein processing at least a portion of the image data using one or more artificial intelligence techniques comprises processing, using one or more artificial intelligence techniques, image data pertaining to one or more of distortion information, image quality, blurriness information, and image size information.

14. The non-transitory processor-readable storage medium of claim 11, wherein processing at least a portion of the image data using one or more artificial intelligence techniques comprises processing at least a portion of the image data using at least one discrete cosine transform in connection with one or more local binary patterns.

15. The non-transitory processor-readable storage medium of claim 11, wherein processing at least a portion of the image data using one or more artificial intelligence techniques comprises processing, using deep learning techniques, portions of the image data associated with one or more given optical features.

16. An apparatus comprising:
at least one processing device comprising a processor coupled to a memory;
the at least one processing device being configured:
to obtain image data associated with at least one event;
to characterize a plurality of attributes of the image data by processing at least a portion of the image data using one or more artificial intelligence techniques and processing metadata associated with at least a portion of the image data using one or more rule-based techniques, wherein processing metadata associated with the at least a portion of the image data comprises processing, using the one or more rule-based techniques, metadata pertaining to location information associated with capture of the image data, temporal information associated with capture of the image data, and one or more indications of photo editing software associated with the image data;
to generate a determination as to whether one or more portions of the image data have been modified based at least in part on the plurality of characterized attributes of the image data; and
to perform one or more automated actions, based at least in part on the determination, in connection with at least one user request related to the image data associated with the at least one event.

17. The apparatus of claim 16, wherein processing at least a portion of the image data using one or more artificial intelligence techniques comprises processing at least a portion of the image data using at least one machine learning-based binary classifier.

18. The apparatus of claim 16, wherein processing at least a portion of the image data using one or more artificial intelligence techniques comprises processing, using one or more artificial intelligence techniques, image data pertaining to one or more of distortion information, image quality, blurriness information, and image size information.

19. The apparatus of claim 16, wherein processing at least a portion of the image data using one or more artificial intelligence techniques comprises processing at least a portion of the image data using at least one discrete cosine transform in connection with one or more local binary patterns.

20. The apparatus of claim 16, wherein processing at least a portion of the image data using one or more artificial intelligence techniques comprises processing, using deep learning techniques, portions of the image data associated with one or more given optical features.

* * * * *